US008839443B2

(12) United States Patent
Krishnamurthy et al.

(10) Patent No.: US 8,839,443 B2
(45) Date of Patent: Sep. 16, 2014

(54) IDENTIFYING AND REMEDYING SECONDARY PRIVACY LEAKAGE

(75) Inventors: Balachander Krishnamurthy, New York County, NY (US); Craig Ellis Wills, Middlesex County, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1013 days.

(21) Appl. No.: 12/288,071

(22) Filed: Oct. 16, 2008

(65) Prior Publication Data

US 2010/0114839 A1     May 6, 2010

(51) Int. Cl.
  *H04L 29/06* (2006.01)
  *G06F 21/62* (2013.01)

(52) U.S. Cl.
  CPC ........ *G06F 21/6263* (2013.01); *H04L 63/0428* (2013.01)
  USPC .......................................................... 726/26

(58) Field of Classification Search
  USPC .......................................................... 726/26
  See application file for complete search history.

(56) References Cited

U.S. PATENT DOCUMENTS

| 8,027,975 | B2* | 9/2011 | Gabriel et al. | 707/731 |
| 2005/0198037 | A1* | 9/2005 | Berman et al. | 707/10 |
| 2008/0243825 | A1* | 10/2008 | Staddon et al. | 707/5 |

OTHER PUBLICATIONS

Aiello, Luca Maria, and Giancarlo Ruffo. "LotusNet: tunable privacy for distributed online social network services." Computer Communications 35.1 (2012): 75-88.*
On Protecting Private Information in Social Networks: A Proposal Bo Luo ; Lee, D. Data Engineering, 2009. ICDE '09. IEEE 25th International Conference on Mar. 29, 2009-Apr. 2, 2009.*
Krishnamurthy, Balachander, et al., "Characterizing Privacy in Online Social Networks", ACM SIGCOMM Workshop on Online Social Networks, 2008.
Krishnamurthy, Balachander, et al., "Generating a Privacy Footprint on the Internet", Proc. of the ACM SIGCOMM Internet Measurement Conference, 2006.
Korolova, Aleksandra, et al., "Link Privacy in Social Networks", IEEE 24th International Conference on Data Engineering, 2008.

* cited by examiner

*Primary Examiner* — Harris Wang
(74) *Attorney, Agent, or Firm* — Wolff & Samson, PC

(57) ABSTRACT

Secondary leakage of private information is identified and remedied. Internet activity of a first party can result in such secondary leakage of private information of a second party. Information about the second party that would not otherwise be known becomes public based simply on related information that has been placed on a public site of a third party by the first party. Such disclosure is detected and the victim may be notified about the location. The victim can then decide if such secondary leakage is acceptable. If not, the first party or the third party may be notified, the activity may be stopped and the offending information can be removed.

6 Claims, 2 Drawing Sheets

IDENTIFYING AND REMEDYING SECONDARY PRIVACY LEAKAGE

BACKGROUND

The technology disclosed in this specification relates generally to the identification and prevention of privacy leakage. The more common type of such privacy leakage may be referred to as "primary leakage". Such primary leakage may involve a user's private information that is entered by the user on the Internet and then obtained and used by others without authority.

A more subtle type of privacy leakage may be referred to as "secondary leakage". Secondary leakage may involve leakage of private information of a second party resulting from activities of a first party. The private information may be available on the electronic site of a third party. The information is available, via the third party, to a large or small group of parties, i.e., the information is "public". The second party may not be aware of this disclosure or of the extent of the disclosure. For example, specific Internet services allow customers to provide email addresses of other Internet users so that these other users can be invited to an event. Such services host content, of interest to the event, which can be updated by the invited parties. However, the supplied addresses become known to the service without any prior approval necessarily obtained from these other Internet users, resulting in secondary leakage. Other examples of secondary leakage are provided below. This type of leakage may be accidental or intentional. However there is a need to identify such secondary leakage and to prevent it.

SUMMARY

In accordance with one aspect of the technology disclosed in this specification, secondary leakage is identified and remedied by monitoring electronic sources of public information, associated with a third party, (public Web sites, social network pages, blogs) for any identification of a second party who is a potential victim of leakage to see if the potential victim has been identified by name or some other distinguishing characteristic. If such disclosure is detected, then the second party is notified of the location where the second party is identified. The second party can then decide if such privacy leakage is acceptable. If not, the first party or the third party is notified of the objectionable leakage. (As used in this context, "or" includes the possibility that both parties are notified, not just one.)

These and other advantages of the technology disclosed in this specification will be apparent to those of ordinary skill in the art by reference to the following detailed description and the accompanying drawings.

DETAILED DESCRIPTION

In accordance with one aspect of the technology disclosed in this specification secondary leakage of privacy information is identified and remedied. A key observation is that Internet activity of a first party can result in leakage of private information of a second party. Information about the second party that would not otherwise be known becomes public based simply on related information that has been placed on the public site of third party, based on the activity of the first party. For example, public content (public Web sites, social network pages, blogs) accessed by a first party may be pro-actively monitored to see if a potential second party victim of leakage has been identified by name or some other distinguishing characteristic on the third party site, i.e., public Web sites, social network pages, blogs. If such disclosure is detected, then the second party victim is notified about the location. The victim can then decide if such privacy leakage is acceptable. If not, the offending first party or third party can be notified.

Figure 1:
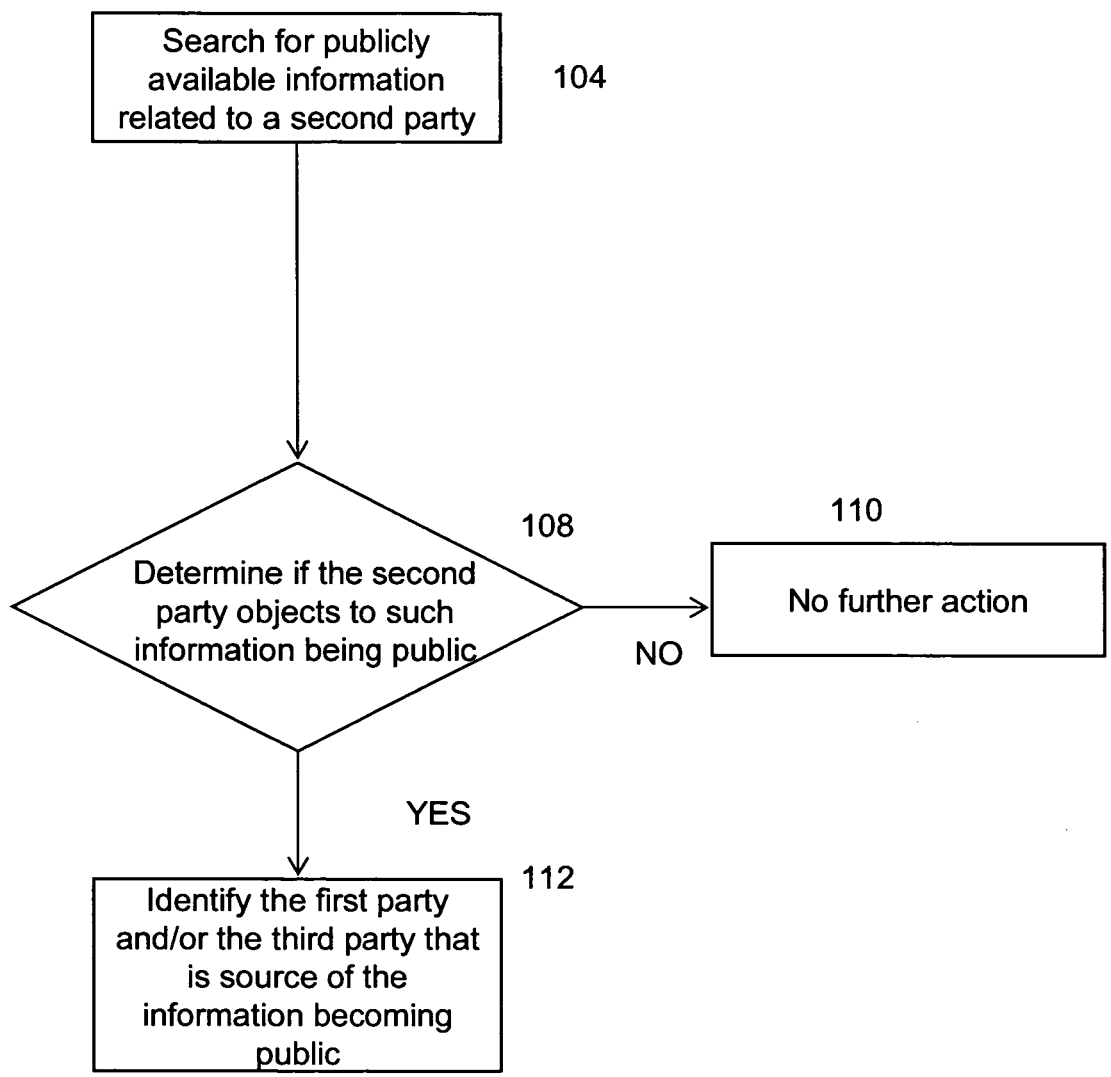
FIG. 1 is a schematic representation of a specific embodiment of the technology disclosed in this specification.

FIG. 1 is a schematic representation of the technology disclosed in this specification. In the figure, at 104 a search is conducted for publicly available information relating to a second party. At 108 it is determined if the second party objects to such information being public. If the second party does not object to such information being public, then at 110 no further action may be taken. If the second party does object to such information being public, the identity of the source of the information can be determined at 112 and remedial action may be taken in accordance with an embodiment of the technology disclosed in this specification.

In an alternative embodiment of the technology disclosed in this specification, a system may learn, as part of the monitoring and notification process, about the victim's sensitivity to publication of various private information of the victim. Over time the system can transmit notifications relating to breaches in privacy, knowing, based on the learned profile, that the victim would find the publication objectionable, and therefore not having to check with the victim each time there is a breach. In addition, by notifying the first party or third party who may be responsible for the breach, future leakage of privacy by the first party user or by the third party can be inhibited.

Secondary leakage information could be leaked to anyone—be it to other users on the Internet or to data aggregating entities. Secondary leakage can also be considered collateral damage to privacy—it is damage that is collateral to the damage that may be caused to the first party user. Often it can be a by-product of the primary leakage. Knowing the extent to which secondary leakage occurs and providing means to block it are essential, given the increasing number of incidents of identity theft and other problems related to privacy on the Internet.

In one embodiment of the technology disclosed in this specification, the manner of detecting secondary leakage can include crawling portions of the Web seeded with queries relating to information of potential victims or by examining related social network pages. Such data gathering has to be done carefully without itself accidentally leaking information. For example, in a variation of the technology disclosed in this specification, the system can limit inadvertent privacy leakage associated with email messages sent by means of a given service provider to gather information on secondary leakage, by intentionally reporting a delivery failure upon receipt of undesirable notifications. Such a failure message would cause providers to assume that the given address is incorrect. Additionally, independent of the failure message, feedback may be provided to the primary sender of these messages that they are not desired. This feedback obviously should not go through the given service provider associated with the original email since we do not want the service provider to know that the address is in fact correct. If the service provider knows that the address is correct further emails will be sent with the damage of associated secondary leakage.

The stages of the identification and remedying process may start with identifying a set of potential secondary leakages that may have occurred for a given user. Care must be taken to ensure that such identification does not inadvertently cause disclosure of any private information. One way to achieve this is just to fetch the information about the user without disclosing anything in return. For example on an OSN ("Online Social Network") we can obtain a list of friends for a given user without giving any hitherto unknown information as long as the user has his list of friends transiently accessible (this is to address the issue that on some OSNs it may be possible to limit access to this information).

On the web, obtaining information without giving out any new private information is harder but not impossible. For example, we can send queries that only involve generic/popular words that can not be matched to the user alone. Effectively we want to create k-anonymity during the query process by sending queries about k different users when we are trying to find secondary leakage information regarding one who will be among the k users. Thus even if the search engine receiving the queries is involved in data, the user has k-anonymity.

Once we have the potential secondary leakage data we can: identify owners of the pages and ask them to remove it; add the set of match locations we found for future checks, learning from the results. (We narrow future searches with increasing frequency on ones we found a match and exponentially backing off on ones that we didn't. A good Web crawler can do this by tracking the rate of change of pages as it revisits a site); or perform a secondary crawl on the hits to see if the secondary leakage has proliferated any further. (While we may not catch all instances this is a better directed search.) Thus we can selectively monitor with higher frequency a given location that has been the source of secondary leakage, as compared to locations that have not been involved in leakage.

Other embodiments of the technology disclosed in this specification may involve pursuing and/or analyzing the search to multiple levels of links. For example, first and third level links that are obtained from the initial search may be studied. To make a search more effective, one may prune the search by focusing it on a limited number of potential sources of the leakage. Such a directed search will aggressively follow only certain links, but may also include other victims in the search.

In alternative embodiments, damage from the secondary leakage is reduced by providing rapid notification to the victim and/or the source—either the first or third parities—so that the information can be removed and the offending behavior stopped, before serious damage occurs, or to limit further damage.

Another example of secondary leakage on the Internet involves companies that provide free electronic mail service to customers and in return have access to the communication graph of the customers and the contents of the messages that are sent and received by them. Such information can be used to tailor advertisements displayed to the customers or to pass on the information to aggregators who can use it in a variety of other ways. Secondary privacy leakage occurs when one customer of free electronic mail service sends an email message to a non-customer of the service. While it is arguable that customer may have been presented with the Acceptable Use Policy and Privacy Policy of the free electronic mail service, the non-customer has not had any opportunity to even be aware of the existence of the Policy. The customer's action results in the leakage of information about the non-customer to the free electronic mail service, specifically the fact that there is a link between customer and non-customer. Additionally, the content of the message may provide a context for such a linkage. If the non-customer replies to the message, then the linkage is confirmed and the provider can collect information about the non-customer that could be potentially correlated with other externally available information about the non-customer. Such external information may be obtained from other services offered by the free electronic mail service or through other data aggregators and service providers.

Similarly, otherwise restricted content on certain news sites can be made accessible to non-subscribers when subscribers provide their email addresses. A message inviting the non-subscribers is sent to them by the news sites which can store the relationship and subsequent access patterns. Even if the invitee does not view the content of the invitation, the email address information and the linkage between the inviter and the invitee is now disclosed to the owner of the news site.

In addition, a variety of social networking sites exist on the Internet that allow users to share information about themselves to friends and other users on the social network. Uploading content, such as pictures, and tagging it with explanatory text is a common practice. When information about other users is disclosed, it can lead to secondary privacy leakage. For example, the tags of the pictures may contain information about named users. Such tags create linkages around the content of the picture or may provide other relationship information (e.g. parent, sibling, etc) between users.

In all of these cases, while the primary first party users may be free to disclose information about themselves, they probably should be not so unconstrained about other people's privacy. In some cases, the second party users may not care about the information that has already been disclosed. However, the technology disclosed in this specification addresses the needs of second parties who would object to disclosure of private information about themselves. Such second parties may not know about such disclosure. Additionally, other users and programs may already have had access to the contents that the second party may deem to be private.

Figure 2:
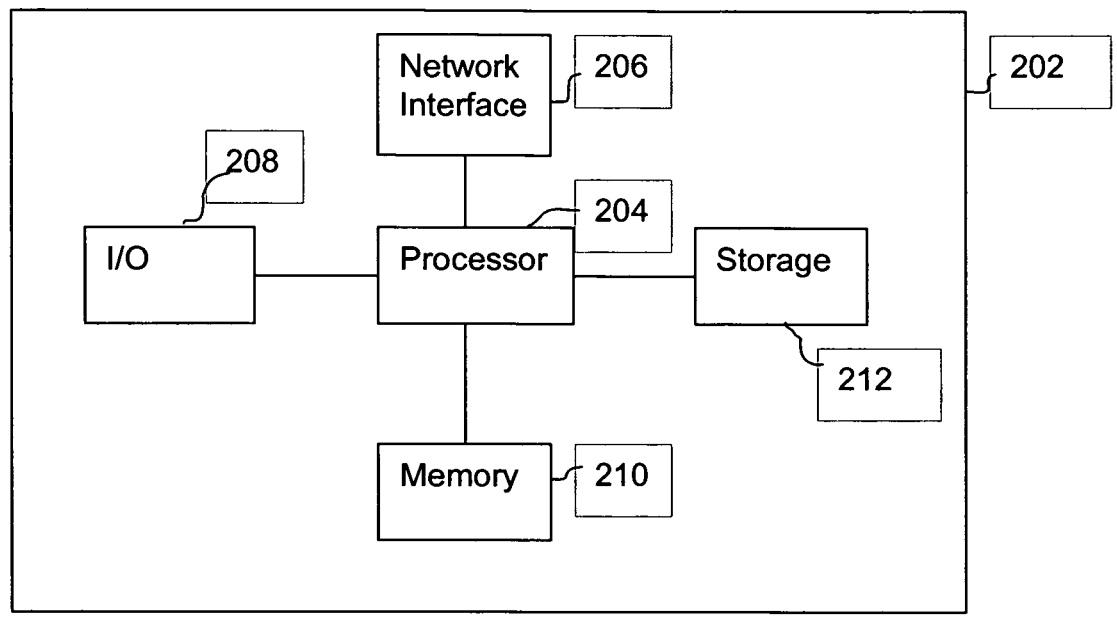
FIG. 2 is a high level block diagram of a computer capable of implementing the technology disclosed in this specification.

The above-described methods may be implemented on an appropriately programmed computer using well-known computer processors, memory units, storage devices, computer software, and other components. A high level block diagram of such a computer is illustrated in FIG. 2. Computer 202 contains a processor 204 which controls the overall operation of the computer 202 by executing computer program instructions which define such operation. The computer program instructions may be stored in a storage device 212, or other computer readable medium (e.g., magnetic disk, CD ROM, etc.), and loaded into memory 210 when execution of the computer program instructions is desired. Thus, the method steps of FIG. 1 can be defined by the computer program instructions stored in the memory 210 and/or storage 212 and controlled by the processor 204 executing the computer program instructions. For example, the computer program instructions can be implemented as computer executable code programmed by one skilled in the art to perform an algorithm defined by the method steps of FIG. 1. Accordingly, by executing the computer program instructions, the processor 204 executes an algorithm defined by the method steps of FIG. 1. The computer 202 also includes one or more network interfaces 206 for communicating with other devices via a network. The computer 202 also includes other input/output devices 208 that enable user interaction with the computer 202 (e.g., display, keyboard, mouse, speakers, buttons, etc.)

One skilled in the art will recognize that an implementation of an actual computer could contain other components as well, and that FIG. 2 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for monitoring electronic leakage of information comprising:
    searching for information, by a processor of a monitoring system independent of an online social network, using a directed search, the information in electronic form and unique to a second party, the information being publicly available as a result of an electronic leakage of information caused by a first party adding the information as explanatory text for content uploaded to the online social network;
    notifying the second party that the information is publicly available, and of a location of the information;
    receiving from the second party a notification that the second party objects to public availability of the information;
    creating a learned profile of sensitivities of the second party based on the notification;
    searching for additional information that is in electronic form and that is unique to the second party, the additional information being publicly available as a result of an electronic leakage of the additional information comprising disclosure of online social network relationship information caused by a tag applied to the content by a third party;
    determining, based on the learned profile of sensitivities, that the second party would object to public availability of the additional information; and
    notifying the third party that the second party objects to public availability of the additional information,
    wherein the location of the information is monitored more frequently than other locations that have not been involved in electronic leakage of information caused by the first party.

2. The method of claim 1 further comprising:
    notifying one of the first party and the third party that the second party objects to public availability of the information.

3. The method of claim 1 wherein searching for information comprises:
    searching for the information utilizing k-anonymity.

4. A non-transitory computer readable medium storing computer program instructions for monitoring electronic leakage of information which, when executed on a processor, cause the processor to perform a method comprising:
    searching for information, by a processor of a monitoring system independent of an online social network, using a directed search, the information in electronic form and unique to a second party, the information being publicly available as a result of an electronic leakage of information caused by a first party adding the information as explanatory text for content uploaded to the online social network; and
    notifying the second party that the information is publicly available, and of a location of the information
    receiving from the second party a notification that the second party objects to public availability of the information;
    creating a learned profile of sensitivities of the second party based on the notification;
    searching for additional information that is in electronic form and that is unique to the second party, the additional information being publicly available as a result of an electronic leakage of the additional information comprising disclosure of online social network relationship information caused by a tag applied to the content by a third party;
    determining, based on the learned profile of sensitivities, that the second party would object to public availability of the additional information; and
    notifying the third party that the second party objects to public availability of the additional information,
    wherein the location of the information is monitored more frequently than other locations that have not been involved in electronic leakage of information caused by the first party.

5. The non-transitory computer readable medium of claim 4 wherein defining searching for information comprises:
    searching for the information utilizing k-anonymity.

6. A system for monitoring electronic leakage of information comprising:
    a memory storing computer program instructions;
    a hardware processor communicatively coupled to the memory, the processor to execute the computer program instructions, which, when executed on the processor, cause the processor to perform operations comprising:
    searching for information that is in electronic form and that is unique to a second party, the information being publicly available as a result of an electronic leakage of information caused by a first party adding the information as explanatory text for content uploaded to an online social network independent of the memory and the hardware processor; and
        notifying the second party that the information is publicly available, and of a location of the information;
    receiving from the second party a notification that the second party objects to public availability of the information;
    creating a learned profile of sensitivities of the second party based on the notification;
    searching for additional information that is in electronic form and that is unique to the second party, the additional information being publicly available as a result of an electronic leakage of the additional information comprising disclosure of online social network relationship information caused by a tag applied to the content by a third party;
    determining, based on the learned profile of sensitivities, that the second party would object to public availability of the additional information; and
    notifying the third party that the second party objects to public availability of the additional information,
    wherein the location of the information is monitored more frequently than other locations that have not been involved in electronic leakage of information caused by the first party.

* * * * *